United States Patent [19]

Chang

[11] Patent Number: 4,601,309
[45] Date of Patent: Jul. 22, 1986

[54] VALVE AND DASH-POT ASSEMBLY

[75] Inventor: Shih-Chih Chang, Richland, Wash.

[73] Assignee: The United States of America as represented by the United States Department of Energy, Washington, D.C.

[21] Appl. No.: 726,565

[22] Filed: Apr. 23, 1985

[51] Int. Cl.⁴ ............................................. F16K 15/03
[52] U.S. Cl. ..................................... 137/514; 137/808; 188/311; 188/322.14
[58] Field of Search .................. 188/297, 311, 322.14, 188/322.11; 137/514, 514.7, 808, 812

[56] References Cited

U.S. PATENT DOCUMENTS

| | | |
|---|---|---|
| 396,950 | 1/1889 | Nickeroson . |
| 949,734 | 2/1910 | Rowbotham . |
| 3,098,502 | 7/1963 | Deve . |
| 3,220,517 | 11/1965 | Lorenz ................................ 188/318 |
| 3,362,508 | 1/1968 | Mayer ................................. 188/319 |
| 3,441,053 | 4/1969 | Robinson . |
| 3,789,872 | 2/1974 | Elliott . |
| 3,942,551 | 3/1976 | Schuller . |
| 4,064,977 | 12/1977 | Taylor . |
| 4,112,977 | 9/1978 | Syred ................................... 137/812 |
| 4,190,078 | 2/1980 | Bielefeldt . |
| 4,330,006 | 5/1982 | Eck ...................................... 137/514 |
| 4,335,644 | 6/1982 | Goes ............................... 137/812 X |
| 4,407,397 | 10/1983 | Fukushima ................... 188/322.14 X |

Primary Examiner—Robert G. Nilson
Attorney, Agent, or Firm—Edward W. Nypaver; Robert Southworth, III; Judson R. Hightower

[57] ABSTRACT

A dash-pot valve comprising a cylinder submerged in the fluid of a housing and having a piston attached to a plunger projecting into the path of closing movement of a pivotal valve member. A vortex chamber in said cylinder is provided with tangentially directed inlets to generate vortex flow upon retraction of said plunger and effect increasing resistance against said piston to progressively retard the closing rate of said valve member toward its seat.

5 Claims, 3 Drawing Figures

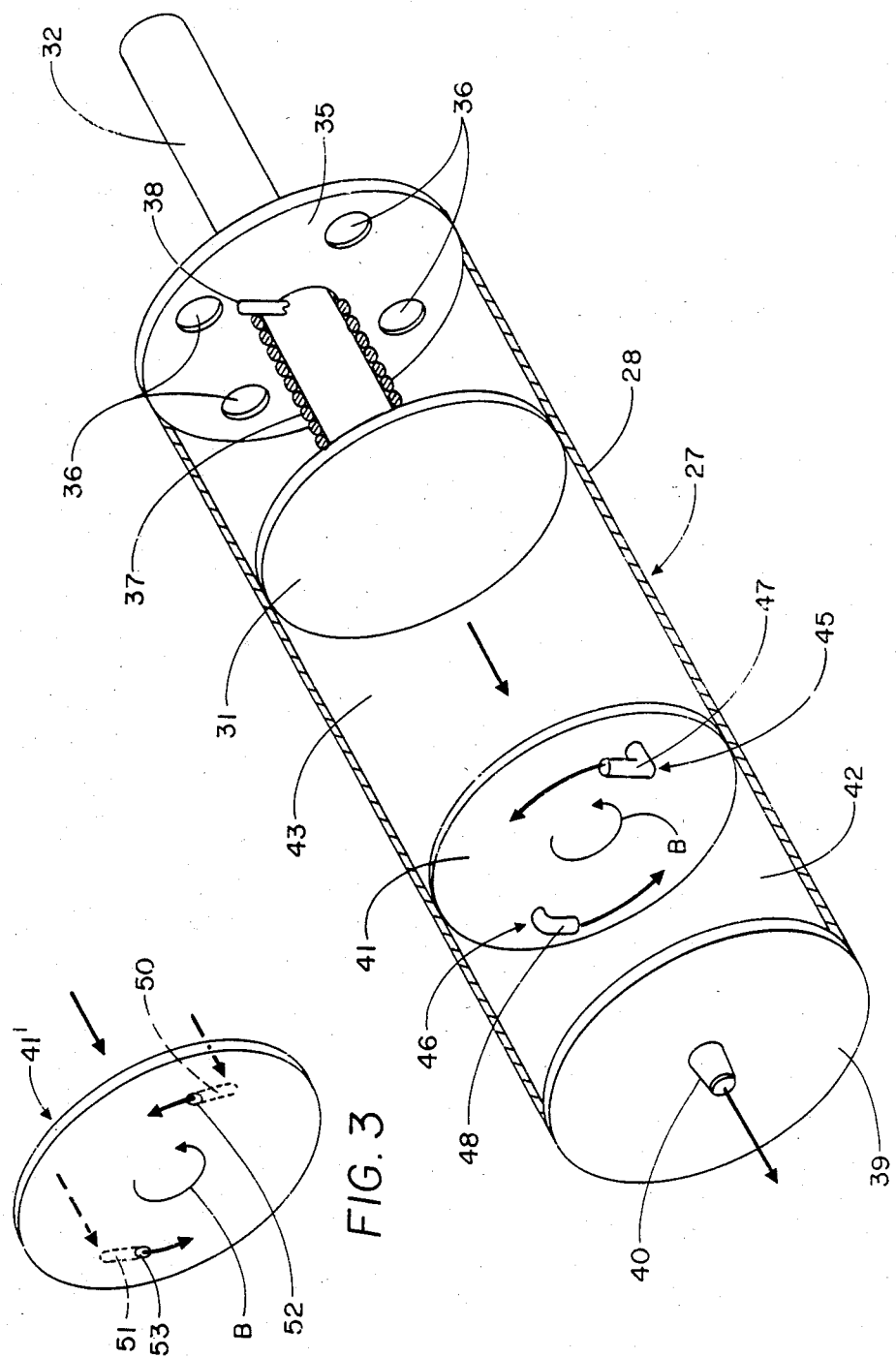

VALVE AND DASH-POT ASSEMBLY

The U.S. Government has rights in this invention pursuant to Contract No. DE-AC06-76FF02170 between the U.S. Department of Energy and the Westinghouse Electric Corporation.

BACKGROUND OF THE INVENTION

This invention relates generally to a check valve assembly and, more particularly, to a specially constructed dash-pot valve assembly associated with the check valve for controlling the closing rate thereof.

The use of dash-pots in conjunction with check valves, especially of the tilting disk valve type, is well known. Typically, these dash-pot valves include a spring loaded operating member or plunger arranged to be engaged by the valve member during the final closing movements thereof toward its associated valve seat. Movement of the plunger is, in turn, dampened by the resistance of a damping fluid in an hydraulic dash-pot system in which the plunger is a component part thereof. The plunger is connect to a piston adapted to be reciprocated within a cylinder having conduits interconnecting opposite ends of the cylinder to provide for the transfer of fluid from one side of the piston to the other. Throttling means, such as orifice restrictions or the like in one of the fluid transfer conduits, is provided for generating the resistance to the plunger to achieve the dampening effect. Many of these known dash-pots are bodily located exteriorly of the fluid conduit housing the check valve and are relatively complex and bulky. The known dash-pots disposed within a fluid conduit and which are submerged in the fluid are formed with narrow nozzles or passageways susceptible to plugging, often rendering them unreliable in operation. Many are provided with one-way valves in their pistons, also vulnerable to malfunction. Additionally, they are complicated in design, costly and difficult to fabricate, and provide only uniform resistance in operation.

Accordingly, it is a primary object of the present invention to obviate the above noted shortcomings by providing an improved dash-pot arrangement retarding the closing rate of an associated valve member.

It is another object of this invention to employ in the foregoing dash-pot arrangement the hydraulic principles of fluid vortex flow to progressively increase load resistance.

It is still another object of the present invention to provide an improved dash-pot arrangement which is simple and strong in construction, rugged and durable in use, inexpensive to manufacture, and which possesses the requisite dynamic response to effect progressive retardation of an associated valve member.

These and other objects, advantages, and characterizing features of this invention will become clearly apparent from the ensuing detailed description of an illustrative embodiment thereof, taken together with the accompanying drawings wherein like reference characters denote like parts throughout the various views.

SUMMARY OF THE INVENTION

A valve and dash-pot assembly including a housing enclosing a valve seat and a valve member for movement between an open position and a closed position against said seat. A dash-pot, submerged in the fluid within said housing, is provided with a cylinder having a piston attached to a plunger projecting into the path of closing movement of the valve member. Retraction of the plunger when contacted by the valve member establishes a vortex flow within the cylinder to effect increasing resistance against the plunger piston and progressively retard closing movement of the valve member toward its seat.

BRIEF DESCRIPTION OF THE DRAWING FIGURES

FIG. 2 is perspective sectional view of the foregoing dash-pot assembly constructed in accordance with this invention; and FIG. 3 is a perspective view of another form of partition plate provided with internal passages therein for use in conjunction with the present invention.

DESCRIPTION OF THE PREFERRED EMBODIMENT

Figure 1:
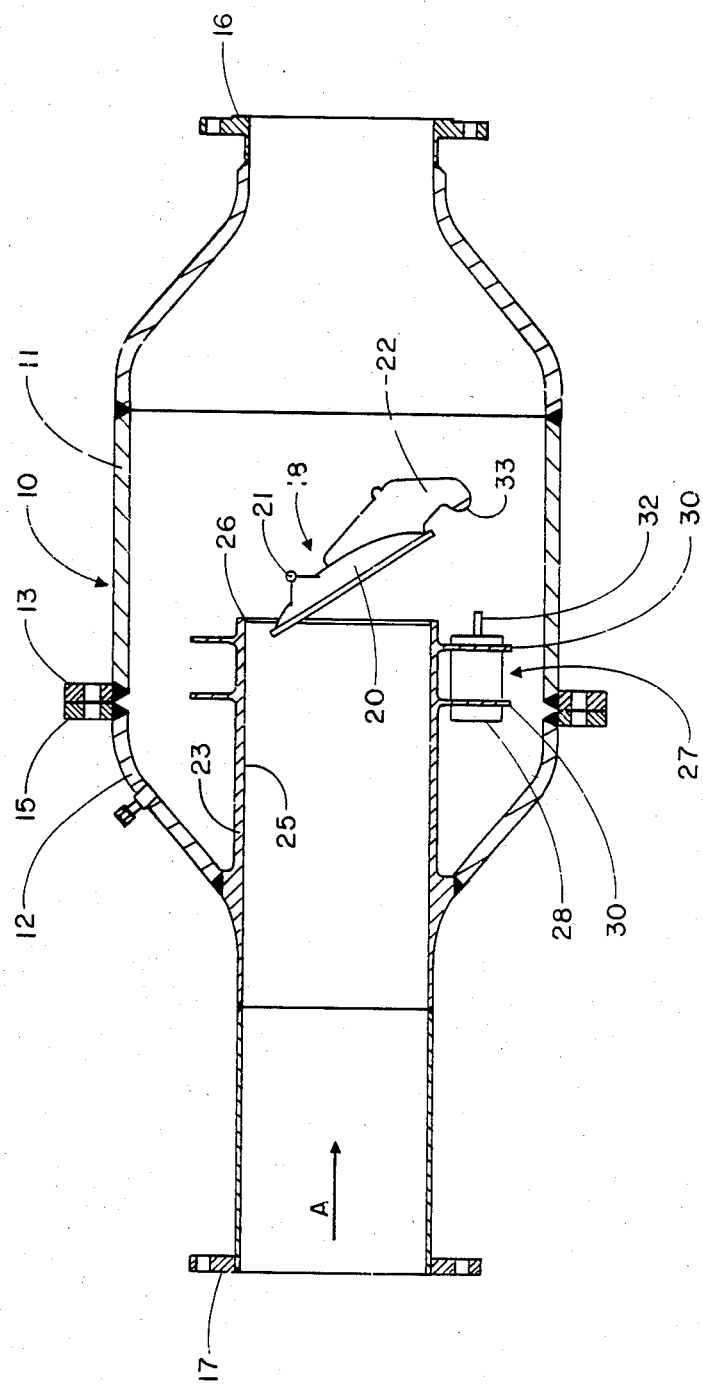
FIG. 1 is a longitudinal sectional view of a piping section, showing a check valve and dash-pot assembly mounted therein.

Referring now in in detail to the illustrative embodiment depicted in the accompanying drawings, there is shown in FIG. 1 a valve housing, generally designated 10, comprised of two sections 11 and 12 provided with inner opposed mating flanges 13 and 15 adapted to be bolted or otherwise secured together and outer flanges 16 and 17 adapted to be fastened to the mating flanges of a conduit or pipeline (not shown). A tilting disk-type check valve, generally designated 18, is mounted in housing section 11 and includes a valve disk 20, often referred to as a "clapper", mounted for pivotal movement about a transversely extending pivot pin 21 between a closed position and an open position. The pin 21 is suitably mounted at its opposite ends in the housing section 11. The valve disk 20 is provided with an integral actuator 22 for a purpose that will hereinafter be described.

The housing section 12 includes a pipe section 23 having a bore 26 which corresponds in diameter to the inner diameter of the pipeline (not shown). The pipe section 23 terminates in a valve seat 26 against which the valve disk 20 closes. The normal direction of fluid flow through the valve is indicated by arrow A. Fluid flow under pressure in the direction of arrow A forces the valve disk 20 off and away from seat 26, permitting unimpeded flow of the fluid.

When flow in the direction of arrow A ceases, the valve disk 20 will return under the force of gravity to impact against the seat 26. Any reverse fluid flow under pressure will move the valve disk 20 at a greater velocity to slam the latter against the seat 26. Not only will this forcible contact of the disk 20 against its associated seat 26 tend to wear and deteriorate the sealing fit therebetween, but also can produce dynamic effects, such as "hammer", to cause serious damage to the pipeline and other components associated therewith.

The present invention addresses this problem by providing a novel dash-pot, generally designated 27, for retarding the closing rate of the valve disk 20. The dash-pot 27 constructed in accordance with this invention comprises a cylinder 28 mounted, as by means of hangers 30, to the underside of pipe section 23 adjacent the inner end thereof. As best shown in FIG. 2, a piston 31 is mounted in cylinder 28 for reciprocating movement relative thereto, and is attached to a plunger 32 adapted to be engaged by a striker portion 33 formed on the lower inner end of actuator 22.

The cylinder 28 is provided with an end wall 35 having a central opening for the passage of plunger 32 therethrough and an array of openings 36 radially spaced from the central opening for the passage of ambient fluid therethrough. A helical tension spring 37 is disposed about the plunger 32 between piston 31 and end wall 35 for urging the plunger 32 outwardly to its operative position shown in FIG. 1. The spring 37 can be welded, as shown at 38 for example, or otherwise fixedly secured at its opposite ends to the end wall 35 and piston 31, respectively.

The other end of cylinder 28 is provided with an end wall 39 having a central aperture provided with a discharge nozzle 40. Spaced longitudinally inwardly from end wall 39 is a stationary plate or partition 41 defining therebetween a chamber 42, hereinafter referred to as a "vortex chamber". The plate 41 also defines a pressure chamber 43 between the plate 41 and piston 31.

A pair of right angularly shaped nozzles 45 and 46 are provided in plate 41 and establish fluid communication between the pressure chamber 43 and the vortex chamber 42. These nozzles 45 and 46 are diametrically opposed and have outlets 47 and 48 extending in opposite directions. As a result, fluid emitted from nozzles 45 and 46 flows tangentially in a circular or spiral direction of progressively decreasing diameter as indicated by arrow B to develop a vortex for a purpose that will presently become apparent.

In operation, the valve disk 20 is opened under the pressure of fluid flowing in the normal direction indicated by arrow A. Upon cessation of flow in such direction, the valve disk 20 will drop or close under the influence of gravity. If there is a corresponding reverse flow opposite to the direction of arrow A, the valve disk 20 will close at a high velocity and, if unimpeded, will slam against the seat 26. However, as the valve disk 20 approaches the seat 26, striker portion 33 will engage the free end of plunger 32 to retard the closing rate of movement of the valve disk 20 as will presently be described.

It should be noted that the dash-pot valve 27 is constantly submerged in the fluid so that the interior of cylinder 28 is completely filled with fluid at all times. The fluid pressures on opposite sides of piston 31 are balanced and the slight tension bias imposed by spring 37 on piston 31 urges and maintains the plunger 32 outwardly into its operative position shown in FIG. 2. When the striker portion 33 engages the plunger 32, it moves the latter and thereby piston 31 inwardly toward plate 41 against the slight resistance of spring 37. During the inward movement of piston 31, fluid displaced from chamber 43 flows through the nozzles 45 and 46 and is discharged therefrom tangentially into the vortex chamber 42. This fluid is forced to spiral in a progressively decreasing diameter flow path, creating a vortex and ultimately exiting through the discharge nozzle 40 into the exterior ambient fluid. The circular shape of the vortex chamber 42 assists in developing an angular acceleration to the fluid stream. By the conservation of angular momentum, the spiraling motion of the fluid is accelerated as it approaches the central exit nozzle 40. This results in an increasing pressure differential commensurate with increased acceleration of the spiraling motion of the fluid until a maximum pressure differential is developed between the fluid inlets 47, 48 and the fluid outlet 40.

As the pressure differential in vortex chamber 42 progressively increases, the pressure in chamber 43 increases proportionately offering increasing resistance to the piston 31 and consequent progressive retardation of the closing movement of valve disk 20. Accordingly, the resistance at initial contact of striker portion 33 with plunger 32 is low and the shock load on the plunger 32, piston 31, and other associated structure is minimal. The resistance then increases until full strength is achieved, allowing the valve disk 20 to gingerly engage its seat 26 and thereby preclude excessive shock loads on the valve seat as well as harmful "hammer" effects in the pipeline.

When fluid again is directed forwardly in the direction of arrow A in pipeline 23 to force the valve disk 20 off its seat 26 into the open position, the fluid pressures in cylinder 28 on opposite sides of the piston 31 are substantially balanced and the bias of spring 37 urges the plunger 32 outwardly into its normal operative position in readiness for the next check valve closing operation. During this return movement of the plunger 32, no vortex action is produced so that resistance to outward movement of the piston 31 and plunger 32 is minimized and recocking is assured.

FIG. 3 illustrates another form of a partition plate 41' that can be employed in lieu of the plate 41 and nozzles 45 and 46 shown in the embodiment of FIG. 2. The plate 41' is formed with passages 50 and 51 extending through the plate 41' at angles relative to the axis thereof. These passages 50 and 51 terminate in inlets 52 and 53 directing the flow of fluid from pressure chamber 43 tangentially into the vortex chamber 42 to create a vortex in the same manner previously described in connection with the embodiment of FIG. 2.

From the foregoing, it is apparent that the objects of the present invention have been fully accomplished. A new and useful dash-pot valve arrangement is provided for retarding the closing of a disk-type check valve at a preselected rate. At the beginning of the retraction stroke of plunger 32, the tangential inlet flow through nozzles 45 and 46 will mix with the stationary fluid already present in vortex chamber 42. This mixing or spiraling action will continuously increase the overall intensity of the vortex in chamber 42. During this period, the pressure differential, closely related to the vortex intensity, increases proportionately until the vortex in chamber 42 is fully developed. The changing pressure differential, in turn, increases the pressure in pressure chamber 43 so that resistance to plunger retraction is slight initially and progressively increases until full strength is reached to allow valve disk 20 to very softly engage its associated valve seat 26, avoiding slamming and adverse concussions or hammering within the piping system.

The foregoing description of a preferred embodiment of this invention has been presented for purposes of illustration and description. It is not intended to be exhaustive or to limit the invention to the precise form disclosed and obviously many modifications and variations are possible in light of the above teaching. It is intended that the scope of the invention be defined by the claims appended hereto.

I claim:

1. A valve and dash-pot assembly comprising: a housing having a valve seat, a valve member pivotally mounted in said housing between a valve open position and a valve closed position engagable against said seat, a dash-pot valve submerged in the fluid within said housing and including a cylinder formed with an end wall having an outlet, and having a reciprocal piston, a plunger attached to said piston and projecting outwardly of said cylinder in the path of closing movement of said valve member, a chamber in said cylinder, means for normally biasing said piston and attached plunger outwardly into an extended position, a fixed plate mounted within said cylinder between said piston and said end wall and provided with fluid passage means which directs fluid tangentailly into said chamber for developing a vortex flow in said chamber upon retraction of said piston to effect increasing resistance against said piston and plunger to progressively retard closing movement of said valve member toward said valve seat, said vortex flow with said resistance not being produced upon outward movement of said piston.

2. An assembly according to claim 1, wherein said fluid passage means comprises diametrically opposed nozzles mounted on said plate within said chamber and establishing fluid communication between opposite sides of said plate.

3. An assembly according to claim 1, wherein said fluid passage means comprises diametrically opposed passages formed through said plate for establishing fluid communication between opposite sides thereof.

4. An assembly according to claim 1, wherein said cylinder is formed with an end wall having an outlet, a fixed plate mounted within said cylinder between said piston and said end wall, said plate separating said cylinder into said first mentioned chamber and a pressure chamber defined in part by said piston, and fluid passage means for establishing fluid communication between said first mentioned chamber and said pressure chamber.

5. An assembly according to claim 4, wherein said fluid passage means directs fluid tangentially into said first mentioned chamber for developing vortex fluid flow therein upon retraction of said piston.

* * * * *